United States Patent
Anand et al.

(10) Patent No.: US 10,970,064 B1
(45) Date of Patent: Apr. 6, 2021

(54) DYNAMICALLY UPDATING A SOFTWARE PROGRAM TO RESOLVE ERRORS

(71) Applicant: Bank of America Corporation, Charlotte, NC (US)

(72) Inventors: Vasuki Anand, Chennai (IN); Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/941,258

(22) Filed: Jul. 28, 2020

(51) Int. Cl.
*G06F 9/44* (2018.01)
*G06F 8/656* (2018.01)
*G06N 3/08* (2006.01)
*H04L 29/08* (2006.01)
*H04L 29/06* (2006.01)

(52) U.S. Cl.
CPC .............. *G06F 8/656* (2018.02); *G06N 3/08* (2013.01); *H04L 67/34* (2013.01); *H04L 67/42* (2013.01)

(58) Field of Classification Search
CPC ........... G06F 8/656; G06F 8/658; G06N 3/08; G06N 3/082; H04L 67/34; H04L 67/36; H04L 67/42
USPC ....................................................... 717/168
See application file for complete search history.

(56) References Cited

U.S. PATENT DOCUMENTS

| | | | |
|---|---|---|---|
| 5,359,730 | A | 10/1994 | Marron |
| 6,006,034 | A | 12/1999 | Heath et al. |
| 6,151,643 | A | 11/2000 | Cheng et al. |
| 6,167,567 | A | 12/2000 | Chiles et al. |
| 6,199,204 | B1 | 3/2001 | Donohue |
| 7,168,003 | B2 | 1/2007 | Lozano et al. |
| 7,237,204 | B2 | 6/2007 | Kasper, II |
| 7,251,812 | B1 | 7/2007 | Jhanwar et al. |
| 7,313,792 | B2 | 12/2007 | Buban et al. |
| 7,702,959 | B2 | 4/2010 | Hwang et al. |
| 8,321,858 | B1 | 11/2012 | Marmaros et al. |
| 8,347,281 | B2 | 1/2013 | Arsenault et al. |

(Continued)

FOREIGN PATENT DOCUMENTS

| | | |
|---|---|---|
| CN | 1983979 A | 6/2007 |
| CN | 1331045 C | 8/2007 |

(Continued)

OTHER PUBLICATIONS

Toolglass and magic lenses: the see-through interface author: EA Bier, published 1993, source: ACM org.*

(Continued)

*Primary Examiner* — Chameli Das
(74) *Attorney, Agent, or Firm* — Michael A. Springs

(57) ABSTRACT

A system and method are provided for dynamically updating a program. An anomaly related to a User Interface (UI) screen of a software application is detected, wherein the program is configured to extract information from a first spatial position on the UI screen. The information includes at least one of text, a computer icon or an image. It is determined, based on the software application, that the anomaly is caused by the information being moved from the first spatial position to a second spatial position on the UI screen. In response, the program is modified to cause the program to extract the information from the second spatial position. The modified program is deployed to extract the information from the second spatial position.

20 Claims, 4 Drawing Sheets

(56) References Cited

U.S. PATENT DOCUMENTS

| | | |
|---|---|---|
| 8,370,811 B2 | 2/2013 | Grechanik et al. |
| 8,683,323 B2 | 3/2014 | Gurfinkel et al. |
| 8,839,221 B2 | 9/2014 | Sapuntzakis et al. |
| 9,134,991 B2 | 9/2015 | Arcese et al. |
| 9,135,151 B2 | 9/2015 | Betak et al. |
| 9,396,552 B1 | 7/2016 | Kloer |
| 9,542,172 B2 | 1/2017 | Alsina et al. |
| 9,555,544 B2 | 1/2017 | Bataller et al. |
| 9,846,634 B2 | 12/2017 | Ji et al. |
| 10,120,656 B1 | 11/2018 | Singh et al. |
| 10,449,670 B2 | 10/2019 | Mummigatti et al. |
| 10,452,674 B2 | 10/2019 | Diwan et al. |
| 10,482,232 B2 | 11/2019 | Buddhiraju et al. |
| 10,503,627 B2 | 12/2019 | Radhakrishnan et al. |
| 10,575,231 B2 | 2/2020 | Gay et al. |
| 10,659,482 B2 | 5/2020 | Shannon et al. |
| 2005/0273779 A1 | 12/2005 | Cheng et al. |
| 2010/0019962 A1* | 1/2010 | Fujita .................. G01S 19/14 342/357.57 |
| 2013/0004087 A1 | 1/2013 | Kumar et al. |
| 2013/0346957 A1 | 12/2013 | Khandelwal et al. |
| 2014/0250426 A1 | 9/2014 | Wang et al. |
| 2014/0359494 A1 | 12/2014 | Clark |
| 2015/0169311 A1 | 6/2015 | Dickerson et al. |
| 2015/0378876 A1* | 12/2015 | Ji .................. G06F 11/3688 714/38.1 |
| 2016/0162285 A1 | 6/2016 | Gilbert et al. |
| 2017/0330115 A1 | 11/2017 | Hankins |
| 2019/0155836 A1* | 5/2019 | Kozuka ............ G06F 3/04842 |
| 2020/0092465 A1* | 3/2020 | Lee .................... G06N 3/08 |
| 2020/0410215 A1* | 12/2020 | Yoo ............ G06Q 20/40145 |

FOREIGN PATENT DOCUMENTS

| | | |
|---|---|---|
| EP | 2109041 A1 | 10/2009 |
| EP | 3112965 A1 | 1/2017 |
| EP | 3675008 A1 | 7/2020 |
| JP | 6036100 B2 | 11/2016 |
| KR | 101176752 B1 | 8/2012 |
| WO | 2020061697 A1 | 4/2020 |

OTHER PUBLICATIONS

The metaDESK: models and prototypes for tangible user interfaces; author: B Ullmer et al, published 1997; source: ACM.*

* cited by examiner

DYNAMICALLY UPDATING A SOFTWARE PROGRAM TO RESOLVE ERRORS

TECHNICAL FIELD

The present disclosure relates generally to managing software programs, and more specifically to dynamically updating a software program to resolve errors.

BACKGROUND

Robotic process automation (RPA) is a technology based on software robots (often referred to as bots) that handle repetitive, rule-based tasks in much the same way as human workers do. RPA bots generally include software programs that perform tedious, admin-driven tasks at higher speeds and levels of accuracy than humans could. RPA bot programs generally work at the presentation layer of a base software application and are configured to extract information from user interface (UI) screens generated for the base software application. The information may include text, computer icons, images and the like. Changes to a base application and associated UI screens on which an RPA bot is configured to operate presents a key challenge to maintaining RPA bot stability. RPA bot programs are generally configured to locate information on a UI screen based on a spatial position of the information presented on the UI screen. A change in the layout of the UI screen may result in a change in the spatial position of one or more elements presented on the UI screen. This in turn may result in the RPA bot not being able to locate information on the UI screen, leading to RPA bot errors and interruption in performing automated tasks that the RPA bot is configured to perform.

SUMMARY

The system and methods implemented by the system as disclosed in the present disclosure provide technical solutions to the technical problems discussed above by monitoring changes to a UI screen from which an RPA bot program is configured to extract information and dynamically updating the program to adjust to any changes detected in the UI screen. The disclosed system and methods provide several practical applications and technical advantages. A bot controller detects an anomaly related to a UI screen, wherein a bot program (e.g., RPA bot) may be configured to extract information (e.g., text, computer icon, image etc.) presented on the UI screen. The bot controller detects the anomaly relating to the UI screen by comparing two or more instances of the UI screen generated at different time instances and by detecting that the two or more instances of the UI screen do not match. The bot controller determines, based on a base software application associated with the UI screen, that the anomaly is caused by a change in spatial positions of one or more elements presented on the UI screen, wherein the elements may include a text field, a computer icon or an image. In response, the bot controller identifies one or more portions of the bot program affected by the change in the spatial positions of the one or more elements and dynamically updates the portions of the bot program to point to the changed spatial positions of the one or more elements. By detecting changes to a UI screen, dynamically updating the bot program to adjust to the changes and deploying the updated bot program in real time, bot errors may be kept from occurring. By keeping bot errors from occurring, the system and method disclosed herein improve the operation of a computer. For example, a bot error may result in a base software application running the RPA bot program becoming unresponsive. By keeping bot errors from occurring, the base software application may be kept from becoming unresponsive. Further, any interruptions in bot related tasks may also be kept from occurring.

In one embodiment, a system includes a memory configured to store a program (e.g., RPA bot program), wherein the program is configured to extract information from a first spatial position on a UI screen of a software application. The information may include one or more of a text, a computer icon and an image. A processor operatively coupled to the memory is configured to detect an anomaly related to the UI screen by comparing a first instance of the UI screen at a first time instant to a second instance of the UI screen at a subsequent time instant and by detecting that the first instance of the UI screen does not match the second instance of the UI screen. The processor determines, based on the software application, that the anomaly is caused by the information being moved from the first spatial position to a second spatial position on the UI screen. In response to the determining, the processor modifies the program to cause the program to extract the information from the second spatial position, wherein modifying the program generates a modified program. The processor modifies the program by identifying at least one portion of the program affected by the moving of the information from the first spatial position to the second spatial position, and by updating the at least one portion of the program to change at least one reference to the first spatial position within the program to refer to the second spatial position.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
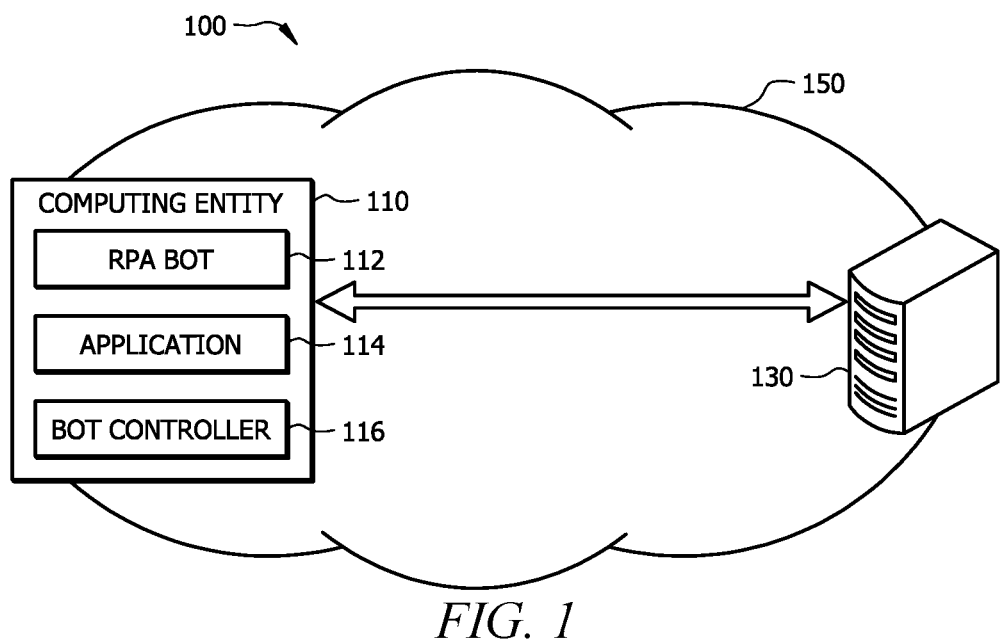
FIG. 1 is a schematic diagram of a system for dynamically modifying an RPA bot program, in accordance with certain embodiments of the present disclosure.

FIG. 1 is a schematic diagram of a system 100 for dynamically modifying an RPA bot program, in accordance with certain embodiments of the present disclosure. As shown, the system 100 includes a computing entity 110 and a server 130, each connected to a network 150. The network 150, in general, may be a wide area network (WAN), personal area network (PAN), a cellular network, or any other technology that allows devices to communicate electronically with other devices. In one or more embodiments, the network 170 may be the internet.

In certain embodiments, the computing entity 110 may include a computing device running one or more software applications. For example, the computing entity 110 may be representative of a computing system hosting software applications that may be installed and run locally or may be used to access software applications running on the server 150. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices.

As shown in FIG. 1, the computing entity 110 includes an RPA bot 112, an application 114 and a bot controller 116. In one embodiment, each of the RPA bot 112, the application 114 and the bot controller 116 may be implemented by at least one processor executing software instructions. In an embodiment, each of the RPA bot 112, the application 114 and the bot controller 116 may be representative of a component of a client server application (or other distributed application) which can communicate with the server 130 over the network 150. For example, the application 114 may be a "thin" client where the processing is largely directed by the application 114 but performed by the server 130.

The application 114 may be a software application capable of generating one or more user interface (UI) screens related to the application. For example, the application may be a designed to generate legal documents that allows a user to generate certain standard legal documents for filing with an appropriate government agency. The application may be configured to generate one or more UI screens that accepts user information (e.g., application number, name, address, legal status, country of citizenship, employer name, gross wages, etc.) from the user for generating legal forms for filing with an agency.

The RPA bot 112 may be a software program that is configured to extract information from one or more UI screens generated by the application 114 and perform one or more tasks based on the extracted information. The information may include text, computer icons and images. Following the legal documents preparation example, the RPA bot 112 may be configured to extract an application number as entered by the user in a respective field on a UI screen of the application 112. The RPA bot 112 may be configured to populate the extracted number information on one or more subsequent UI screens generated during preparation of the forms for the user and/or retrieve the user's history and status based on the extracted application number.

The bot controller 116 is configured to monitor and detect changes in a layout of one or more UI screens generated by the application 114, identify the changes, and modify the RPA bot 112 based on the identified changes. Following the legal documents preparation example, the RPA bot 112 may be configured to extract the application number of the user from a text field in a top portion of the UI screen. The application 114 may modify the UI screen by moving the text field to a bottom portion of the UI screen. The bot controller 116 may detect that a change has occurred to the UI screen that affects the RPA bot 112, identify that the change includes the text field being moved from the top portion to the bottom portion of the UI screen, and modify the RPA bot 112 to cause the RPA bot 112 to extract the application number from the changed position of the text field in subsequent instances of the UI screen.

The operations of the RPA bot 112, application 114 and bot controller 116 will now be described in more detail.

Figure 2:
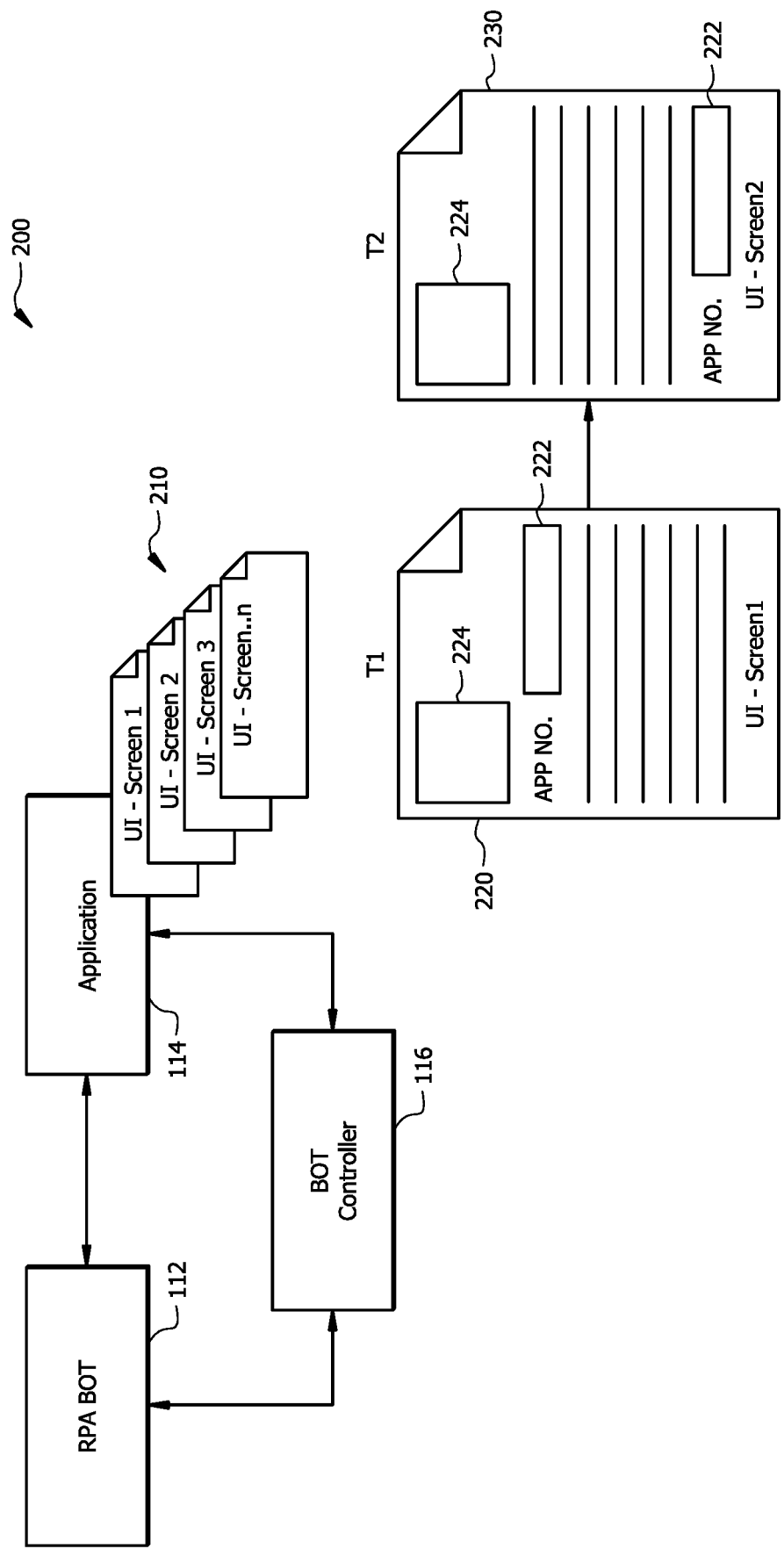
FIG. 2 is a conceptual block diagram of a system for dynamically modifying an RPA bot program, in accordance with certain embodiments of the present disclosure.

FIG. 2 is a conceptual block diagram of a system 200 for dynamically modifying an RPA bot program, in accordance with certain embodiments of the present disclosure. As shown in FIG. 2, the application 114 may be configured to generate a sequence of UI screens 210 (shown as including UI screens 1-$n$). The RPA bot 112 is configured to extract information from one or more of the UI screens 210 generated by the application 114 and perform one or more tasks based on the extracted information. The information may include text, computer icons and images. The RPA bot 112 generally locates a piece of information on a UI screen 210 based on pre-configured spatial position of the information on the UI screen 210. The RPA bot 112 may be configured to identify the spatial position of one or more elements (e.g., text fields, computer icons, images etc.) of a UI screen 210 using one or more 2-dimensional (2D) spatial coordinates of the elements on the UI screen. The spatial coordinates may be a single set of spatial coordinates identifying a single point on the UI screen 210 or a cluster of spatial coordinates identifying an area of the UI screen 210. Following the legal documents preparation example, the RPA bot 112 may locate a text field on a UI screen 210 in which the user enters an application number, using the 2D spatial coordinates of the text field and may extract the application number from the located text field. In an embodiment the bot program of the RPA bot 112 may include references to the spatial coordinates of the elements of the UI screen 210 from which the RPA bot 112 is configured to extract information. For example, the software code of the RPA bot program may explicitly point to the spatial coordinates of the UI elements to cause the RPA bot 112 to locate the UI elements at the respective positions indicated by the spatial coordinates.

The bot controller 116 is configured to monitor and detect changes in a layout of one or more UI screens generated by the application 114, identify the changes, and modify the RPA bot 112 based on the identified changes. For example, FIG. 2 shows two different instances 220 and 230 of UI screen 1 generated at time instants T1 and T2, wherein T2 is subsequent to T1. UI screen 220 at T1 may be representative of a baseline UI screen 1 having a UI layout based on which the RPA bot 112 is configured. For example, at time T1 the RPA bot may point to spatial coordinates of one or more elements of the UI screen 1 (UI screen 220) in accordance with the baseline layout of the UI screen 1 at time T1. As shown, the UI screen 1 may include a text field 222 and an image/icon container field 224. The text field 222 may include alphanumeric text and the image/icon container field 224 may include an image or a computer icon. At time T1, the RPA bot 112 may be configured with the spatial coordinates of one or more of the text field 222 and the image/icon container field 224 in accordance with the baseline layout of the UI screen 1 (UI screen 220) at time T1.

However, if the layout of the UI screen 1 changes from T1 to T2 such that one or more of the text field 222 and the image/icon container field 224 is no more at their respective preconfigured spatial positions, the RPA bot 112 may not locate the text field 222 and/or the image/icon container field 224 at the respective preconfigured spatial coordinates. This may lead to an error in the RPA bot 112. As shown in FIG. 2, UI screen 230 at time T2 has a modified layout of UI screen 1 where the text field 222 has moved to a different spatial position within the UI screen 1.

In certain embodiments, the bot controller 116 detects an anomaly related to a UI screen 210 by comparing two or more instances of the UI screen 210 rendered at different time instances and by detecting that the two or more instances of the UI screen do not match. For example, the bot controller 116 may compare the UI screen 220 at time T1 with UI screen 230 at T2 and may detect that the layouts of the two UI screen instances do not match. In an embodiment, the bot controller 116 may use pattern recognition to determine that two instances of a UI screen at two different time instants do not match. For example, the bot controller 116 may be configured to compare a baseline UI layout pattern of UI screen 1 with the layout pattern of each subsequent instance of the UI screen 1 that the bot controller 116 monitors. A layout pattern may refer to the spatial arrangement of elements (e.g., text fields, icons, images) in a UI screen. The bot controller 116 may determine that a mismatch has occurred when the layout pattern of a subsequent instance of the UI screen 1 does not match with the baseline UI pattern of UI screen 1. In the context of FIG. 2, bot controller 116 may compare the baseline UI pattern of UI screen 220 with the layout pattern of UI screen 230. Since the spatial position of the text field 222 is different in the two UI screen instances, the bot controller 116 may determine that the UI screens 220 and 230 do not match. In an alternative embodiment, the bot controller 116 may detect that that two instances of the UI screen 210 do not match by detecting that one or more elements the RPA bot 112 is configured to locate are no more at their preconfigured spatial positions. In the context of FIG. 2, the bot controller 116 may detect that one or more of the text field 222 and the icon/mage container field 224 are no more accessible at the preconfigured spatial positions in accordance with the baseline UI layout of screen 220.

In an embodiment, deep learning methods may be used to detect an anomaly related to a UI screen 210. For example, a Recurrent Neural Network (RNN)-Long Short Term Memory (LSTM) may be used to detect the anomaly related to the UI screen 210. LSTM is an artificial RNN architecture used in the field of deep learning. Unlike standard feed forward neural networks, LSTM has feedback connections. LSTM networks are well-suited to classifying, processing and making predictions based on time series data. LSTM unit is composed of a cell, an input gate, an output gate and a forget gate. The cell remembers values over arbitrary time intervals and the three gates regulate the flow of information into and out of the cell. Since the changes related to the UI screen 210 progress in time sequence order, LSTM may be used to detect an anomaly in the UI Screen 210 of the base application in time sequence order. As described above, the anomaly in the UI screen may be caused by a change in spatial positions of one or more elements presented on the UI screen, wherein the elements may include a text field, a computer icon or an image. Spatial image/schema of the UI screen at time t may be parsed into deep learning (i.e. LSTM neural network) to detect any anomaly. The deep learning system may be trained on multiple sets of data to understand the previous UI schema. The LSTM system may also validate that the anomaly is caused by an intentional change in at least one of a model layer, view layer or a controller layer of the base software application.

Once the bot controller 116 detects an anomaly related to a UI screen 210, the bot 116 verifies whether the anomaly was caused by an intentional modification to the base application 114 or was a result of an error (e.g., UI screen rendering error). In an embodiment, the bot controller 116 may examine at least one logic layer of the application 114 to determine whether the anomaly was caused by an intentional change to the application 114. For example, the application 114 may be based on a model-view-controller (MVC) design pattern. The model layer is a central component of the pattern and manages the data, logic and rules of the application 114. The view layer generates the presentation of the model on the UI screen in a particular format in accordance with the model layer. The controller layer accepts input (e.g., from the user) and converts it to commands for the model layer or view layer. The bot controller 116 may examine one or more of the model, view and controller layers of the application 114 to verify whether the detected anomaly is as a result of an intentional change to the layout of the UI screen 210. For example, the bot controller 116 may check the model layer to determine if the logic related to the UI screen 1 has changed. Additionally or alternatively, the bot controller 116 may check the view layer to determine if the presentation of the UI screen 1 has changed. The bot controller 116 may determine that the detected anomaly was caused by an intentional change in the base application 114 if the bot controller 116 detects that the logic related to the UI screen 1 has changed and/or the presentation of the UI screen 1 has changed.

Once the bot controller 116 verifies that the anomaly related to a UI screen 210 is caused by an intentional modification to the base application 114, the bot controller 116 identifies the one or more changes in the layout of the UI screen 210 that is causing the anomaly. For example, the bot controller may check the logic related to the UI screen 1 in the model layer of the application 114 and/or the presentation of the UI screen 1 in the view layer of the application 114, and identify that the anomaly is caused as a result of the text field 222 moving from its pre-configured spatial position to a new spatial position within the UI screen 1. Additionally, the bot controller 116 determines the new spatial position of the text field 220 by identifying the new spatial coordinates of the text field 222 within the UI screen 1. For example, the bot controller 116 may determine the new spatial coordinates of the text field 222 from the modified logic related to the UI screen 1 in the model layer of the application 114.

Once the bot controller 116 identifies the change in the layout of a UI screen 210 that caused the anomaly, the bot controller 116 modifies the bot program of the RPA bot 112 in accordance with the identified change. For example, the bot controller 116 may identify one or more portions of the bot program that refer to the preconfigured spatial position of the text field 222 (e.g., in accordance with the baseline layout of the UI screen 1) and may update the one or more portions of the bot program to change the references to the preconfigured spatial position of the text field 222 to the modified spatial position of the text field 222. This may include changing each reference in the bot program to the preconfigured spatial coordinates of the text field 222 (e.g., in accordance with the baseline layout of the UI screen 1) to the modified spatial coordinates of the text field 222. As described above, the spatial coordinates may be a single set of spatial coordinates identifying a single point on the UI screen 1 or a cluster of spatial coordinates identifying an area of the UI screen 1. Once the bot program of the RPA bot 112 is modified, the RPA bot 112 may locate the text field 222 at the modified spatial position in subsequent instances of the UI screen 1.

In one embodiment, before deploying the modified RPA bot 112 in a production system, the RPA bot 112 is first tested in a test system to check whether the modified RPA bot 112 operates without errors. For example, the bot controller 116 first deploys the modified RPA bot 112 in the test system and validates whether the modified RPA bot 116 can successfully locate the text field 222 at its modified spatial position in the UI screen 1 and can extract text from the text field 222 at the modified spatial position. The bot controller 116 determines that the validation of the modified RPA bot 112 is successful, if the modified RPA bot 112 successfully locates the text field 222 at the modified spatial position and extracts the text from the text field 222. Upon successful validation of the modified RPA bot 112, the bot controller 116 deploys the modified bot program 112 in the production system to cause the RPA bot 112 to locate and extract text from the modified spatial position of the text field 222 in subsequent instances of the UI screen 1.

Figure 3:
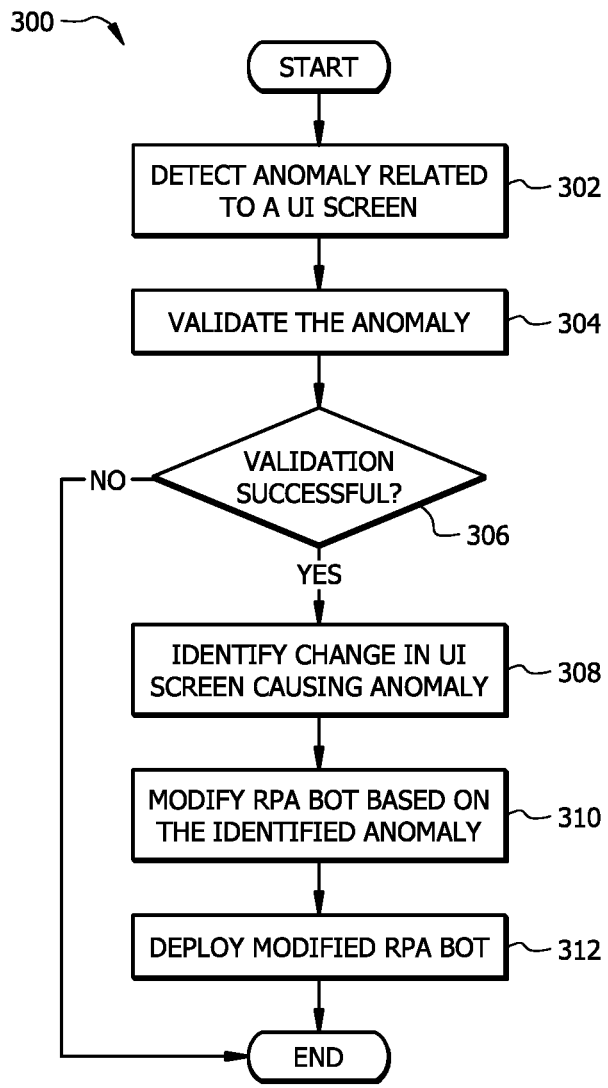
FIG. 3 illustrates a flowchart of an example method for dynamically modifying an RPA bot, in accordance with certain embodiments of the present disclosure.

FIG. 3 illustrates a flowchart of an example method 300 for dynamically modifying an RPA bot (e.g., RPA bot 112), in accordance with certain embodiments of the present disclosure. In an embodiment the method 300 may be performed by a bot controller 116 as described above with reference to FIGS. 1 and 2.

At step 302, the bot controller 116 detects an anomaly related to a UI screen (e.g., UI screen 210 as shown in FIG. 2). As described above, the bot controller 116 is configured to monitor and detect changes in a layout of one or more UI screens generated by a base application (e.g., base application 114), identify the changes, and modify the RPA bot 112 based on the identified changes. The bot controller 116 detects an anomaly related to a UI screen 210 by comparing two or more instances of the UI screen 210 rendered at different time instances and by detecting that the two or more instances of the UI screen do not match. For example, the bot controller 116 may compare a first instance of a UI screen 1 (e.g., UI screen 220) at a first time instant T1 with a second instance of the UI screen 1 (e.g., UI screen 230) at a subsequent time instant T2 and may detect that the layouts of the two UI screen instances do not match. In an embodiment, the bot controller 116 may use pattern recognition to determine that the first and second instances of the UI screen 1 do not match. For example, the bot controller 116 may compare a baseline UI layout pattern of the first instance of the UI screen 1 at time instant T1 with the layout pattern of the second instance of the UI screen 1 at time instant T2. A layout pattern may refer to the spatial arrangement of elements (e.g., text fields, icons, images) in a UI screen. The bot controller 116 may determine that a mismatch has occurred when the layout pattern of the second instance of the UI screen 1 does not match with the baseline UI pattern of the first instance of the UI screen 1. The mismatch in the layout patterns may be as a result of one or more elements of the UI screen 1 changing spatial positions between the time instants T1 and T2. As shown in FIG. 2, since the spatial position of the text field 222 is different in the two UI screen instances 220 and 230, the bot controller 116 may determine that the UI screens 220 and 230 do not match. In an alternative embodiment, the bot controller 116 may detect that that two instances of the UI screen 210 do not match by detecting that one or more elements the RPA bot 112 is configured to locate are no more at the preconfigured spatial positions. The preconfigured spatial positions of the one or more elements may be in accordance with the baseline layout of the UI screen at the first time instant T1. As described above with reference to FIG. 2, the bot controller 116 may detect that the text field 222 is no more accessible at the preconfigured spatial position in accordance with the baseline UI layout of screen 220 and in response determine that the two UI screen instances do not match.

At step 304, the bot controller 116 validates the detected anomaly related to the UI screen 210. Once the bot controller 116 detects an anomaly related to the UI screen 210, the bot 116 verifies whether the anomaly was caused by an intentional modification to the base application 114 or was a result of an error (e.g., UI screen rendering error). In an embodiment, the bot controller 116 may examine at least one logic layer of the application 114 to determine whether the anomaly was caused by an intentional change to the application 114. For example, the bot controller 116 may examine one or more of the model, view and controller layers of the application 114 to verify whether the detected anomaly is as a result of an intentional change to the layout of the UI screen 210. For example, the bot controller 116 may check the model layer to determine if the logic related to the UI screen 1 has changed. Additionally or alternatively, the bot controller 116 may check the view layer to determine if the presentation of the UI screen 1 has changed. The bot controller 116 may determine that the detected anomaly was caused by an intentional change in the base application 114 if the bot controller 116 detects that the logic related to the UI screen 1 has changed and/or the presentation of the UI screen 1 has changed.

At step 306, the bot controller 116 checks whether the validation of step 304 was successful. The bot controller 116 determines the validation of step 304 was successful when the both controller 116 determines that the detected anomaly related to the UI screen 210 was caused by an intentional change in the base application 114. If the bot controller 116 determines that the validation was successful, the method 300 proceeds to step 308 where the bot controller modifies the RPA bot 112 identifies one or more changes in the UI screen 210 that caused the anomaly. For example, the bot controller may check the logic related to the UI screen 1 in the model layer of the application 114 and/or the presentation of the UI screen 1 in the view layer of the application 114, and identify that the anomaly is caused as a result of the text field 222 moving from its pre-configured spatial position (e.g., according to the baseline UI screen layout of UI screen instance 220) to a new spatial position within the UI screen 1 (e.g., UI screen instance 230). Additionally, the bot controller 116 may determine the new spatial position of one or more the UI screen elements from the model layer and/or view layer of the application 114. For example, the bot controller 116 may determine the new spatial position of the text field 220 by identifying the new spatial coordinates of the text field 222 within the UI screen 1. The bot controller 116 may determine the new spatial coordinates of the text field 222 from the modified logic related to the UI screen 1 in the model layer.

At step 308, the bot controller 116 modifies the RPA bot 112 based on the identified change to the UI screen 210. Once the bot controller 116 identifies the change in the layout of a UI screen 210 that caused the anomaly, the bot controller 116 modifies a bot program of the RPA bot 112 in accordance with the identified change to the layout of the UI screen 210. For example, the bot controller 116 may identify one or more portions of the bot program that refer to the preconfigured spatial position of the text field 222 (e.g., in accordance with the baseline layout of the UI screen 1) and may update the one or more portions of the bot program to change the references to the preconfigured spatial position of the text field 222 to the modified spatial position of the text field 222. This may include changing each reference in the bot program to the preconfigured spatial coordinates of the text field 222 (e.g., in accordance with the baseline layout of the UI screen 1) to the modified spatial coordinates of the text field 222. Once the bot program of the RPA bot 112 is modified, the RPA bot 112 may locate the one or more elements of the UI screen 210 at their respective modified spatial coordinates. For example, once the bot program of the RPA bot 112 is modified, the RPA bot 112 may locate the text field 222 at the modified spatial position in subsequent instances of the UI screen 1.

At step 312, the bot controller deploys the modified RPA bot 112 to cause the RPA bot 112 to locate and extract information from the modified spatial positions of the one or more elements of the UI screen. For example, once deployed the RPA bot 112 may locate and extract text from the modified spatial position of the text field 222 in subsequent instances of the UI screen 1.

Figure 4:
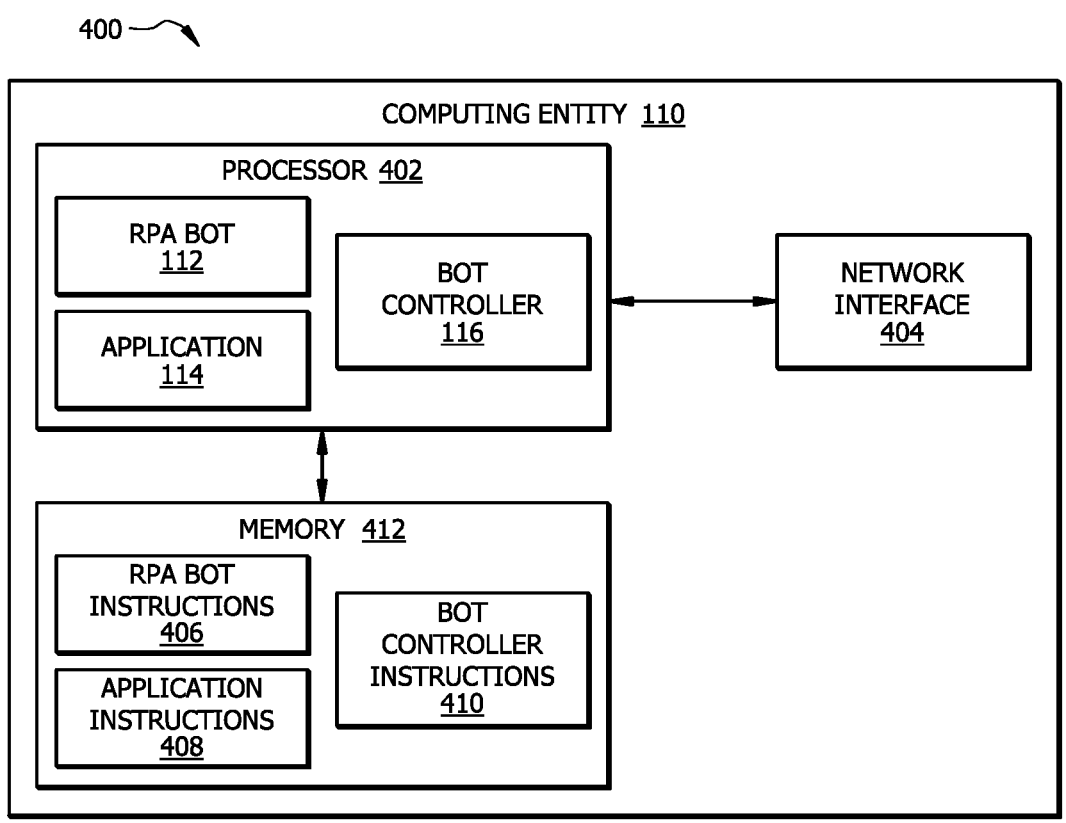
FIG. 4 illustrates an example schematic diagram of a computing entity, in accordance with one or more embodiments of the present disclosure.

FIG. 4 illustrates an example schematic diagram 400 of a computing entity (e.g., computing entity 110), in accordance with one or more embodiments of the present disclosure. The computing entity 110 comprises a processor 402, a memory 412, and a network interface 404. The computing entity 110 may be configured as shown in FIG. 4 or in any other suitable configuration.

The processor 402 comprises one or more processors operably coupled to the memory 412. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 412. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (RPA bot instructions 406, application instructions 408 and bot controller instructions 410) to implement the RPA bot 112, the application 114 and the bot controller 116. In this way, processor 402 may be a special-purpose computer designed to implement the functions disclosed herein. In one or more embodiments, each of the RPA bot 112, the application 114 and the bot controller 116 are implemented using logic units, FPGAs, ASICs, DSPs, or any other suitable hardware. The RPA bot 112, the application 114 and the bot controller 116 are configured to operate as described with reference to FIGS. 1-3. For example, the RPA bot 112, the application 114 and the bot controller 116 may be configured to perform at least a portion of the flowchart 300 as described in FIG. 3, respectively.

The memory 412 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store the RPA bot instructions 406, application instructions 408 and bot controller instructions 410 and/or any other data or instructions. Each of the RPA bot instructions 406, application instructions 408 and bot controller instructions 410 may include any suitable set of instructions, logic, rules, or code operable to execute the RPA bot 112, the application 114 and the bot controller 116 respectively.

The network interface 404 is configured to enable wired and/or wireless communications. The network interface 404 is configured to communicate data between the computing entity 110 and other devices (e.g. server 150), systems, or domains. For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory configured to store a program, wherein the program is configured to extract information from a first spatial position on a User Interface (UI) screen of a software application, wherein the information comprises at least one of text, a computer icon or an image; and
a processor operatively coupled to the memory and configured to:
detect an anomaly related to the UI screen by:
comparing a first instance of the UI screen at a first time instant to a second instance of the UI screen at a subsequent second time instant; and
detecting that the first instance of the UI screen does not match the second instance of the UI screen;
determine, based on the software application, that the anomaly is caused by the information being moved from the first spatial position to a second spatial position on the UI screen;
in response to the determining, modify the program to cause the program to extract the information from the second spatial position, wherein the modifying generates a modified program, wherein the modifying comprises:
identifying at least one portion of the program affected by the moving of the information from the first spatial position to the second spatial position; and
updating the at least one portion of the program to change at least one reference to the first spatial position to refer to the second spatial position, wherein the at least one reference to the first spatial position comprises spatial coordinates of the first spatial position; and
deploy, in a test system, the modified program to extract the information from the second spatial position.

2. The system of claim 1, wherein the processor is configured to detect that the first instance of the UI screen does not match the second instance of the UI screen by detecting that a first pattern related to the first instance of the UI screen does not match a second pattern related to the second instance of the UI screen.

3. The system of claim 1, wherein the processor is further configured to detect the anomaly related to the UI screen by detecting that the information is no more accessible at the first spatial position on the UI screen.

4. The system of claim 1, wherein the processor is configured to determine that the information has moved by:
inspecting at least one of a model layer, view layer or a controller layer of the software application; and
determining, based on the inspecting, that the UI screen has been changed to present the information at the second spatial position on the UI screen.

5. The system of claim 1, wherein:
updating the at least one portion of the program comprises changing each instance of the spatial coordinates of the first spatial position in the program to spatial coordinates of the second spatial position.

6. The system of claim 1, wherein the processor is further configured to:
validate that the anomaly is caused by an intentional change in at least one of a model layer, view layer or a controller layer of the software application, wherein the program is modified in response to the validating.

7. The system of claim 1, wherein each of the first spatial position and the second spatial position comprises a two-dimensional (2D) positional coordinate or a cluster of 2-D positional coordinates.

8. The system of claim 1, wherein the processor is configured to deploy the modified program by:
validating results of the deploying in the test system; and
deploying the modified program in a production system in response to a successful validation.

9. The system of claim 1, wherein the program comprises a Robotic Process Automation (RPA) Robot (BOT) program.

10. A method for managing a program, comprising:
detecting an anomaly related to a User Interface (UI) screen of a software application, wherein the program is configured to extract information from a first spatial position on the UI screen, wherein the information comprises at least one of text, a computer icon or an image, wherein the detecting comprises:
comparing a first instance of the UI screen at a first time instant to a second instance of the UI screen at a subsequent second time instant; and
detecting that the first instance of the UI screen does not match the second instance of the UI screen;
determining, based on the software application, that the anomaly is caused by the information being moved from the first spatial position to a second spatial position on the UI screen;
in response to the determining, modifying the program to cause the program to extract the information from the second spatial position, wherein the modifying generates a modified program, wherein the modifying comprises:
identifying at least one portion of the program affected by the moving of the information from the first spatial position to the second spatial position; and
updating the at least one portion of the program to change at least one reference to the first spatial position to refer to the second spatial position, wherein the at least one reference to the first spatial position comprises spatial coordinates of the first spatial position; and
deploying, in a test system, the modified program to extract the information from the second spatial position.

11. The method of claim 10, wherein detecting that the first instance of the UI screen does not match the second instance of the UI screen comprises detecting that a first pattern related to the first instance of the UI screen does not match a second pattern related to the second instance of the UI screen.

12. The method of claim 10, wherein detecting the anomaly related to the UI screen comprises detecting that the information is no more accessible at the first spatial position on the UI screen.

13. The method of claim 10, wherein determining that the information has moved by:
inspecting at least one of a model layer, view layer or a controller layer of the software application; and
determining, based on the inspecting, that the UI screen has been changed to present the information at the second spatial position on the UI screen.

14. The method of claim 10, wherein:
updating the at least one portion of the program comprises changing each instance of the spatial coordinates of the first spatial position in the program to spatial coordinates of the second spatial position.

15. The method of claim 10, further comprising:
validating that the anomaly is caused by an intentional change in at least one of a model layer, view layer or a controller layer of the software application, wherein the program is modified in response to the validating.

16. The method of claim 10, wherein each of the first spatial position and the second spatial position comprises a two-dimensional (2D) positional coordinate or a cluster of 2-D positional coordinates.

17. The method of claim 10, wherein deploying the modified program comprises:
validating results of the deploying in the test system; and
deploying the modified program in a production system in response to a successful validation.

18. The method of claim 10, wherein the program comprises a Robotic Process Automation (RPA) Robot (BOT) program.

19. A non-transitory computer-readable medium for storing instructions which when executed by a processor causes the processor to perform a method for managing a program, the method comprising:
- detecting an anomaly related to a User Interface (UI) screen of a software application, wherein the program is configured to extract information from a first spatial position on the UI screen, wherein the information comprises at least one of text, a computer icon or an image, wherein the detecting comprises:
  - comparing a first instance of the UI screen at a first time instant to a second instance of the UI screen at a subsequent second time instant; and
  - detecting that the first instance of the UI screen does not match the second instance of the UI screen;
- determining, based on the software application, that the anomaly is caused by the information being moved from the first spatial position to a second spatial position on the UI screen;
- in response to the determining, modifying the program to cause the program to extract the information from the second spatial position, wherein the modifying generates a modified program, wherein the modifying comprises:
  - identifying at least one portion of the program affected by the moving of the information from the first spatial position to the second spatial position; and
  - updating the at least one portion of the program to change at least one reference to the first spatial position to refer to the second spatial position, wherein the at least one reference to the first spatial position comprises spatial coordinates of the first spatial position; and
- deploying, in a test system, the modified program to extract the information from the second spatial position.

20. The non-transitory computer-readable medium of claim 19, wherein:
- updating the at least one portion of the program comprises changing each instance of the spatial coordinates of the first spatial position in the program to spatial coordinates of the second spatial position.

* * * * *